Patented Apr. 1, 1947

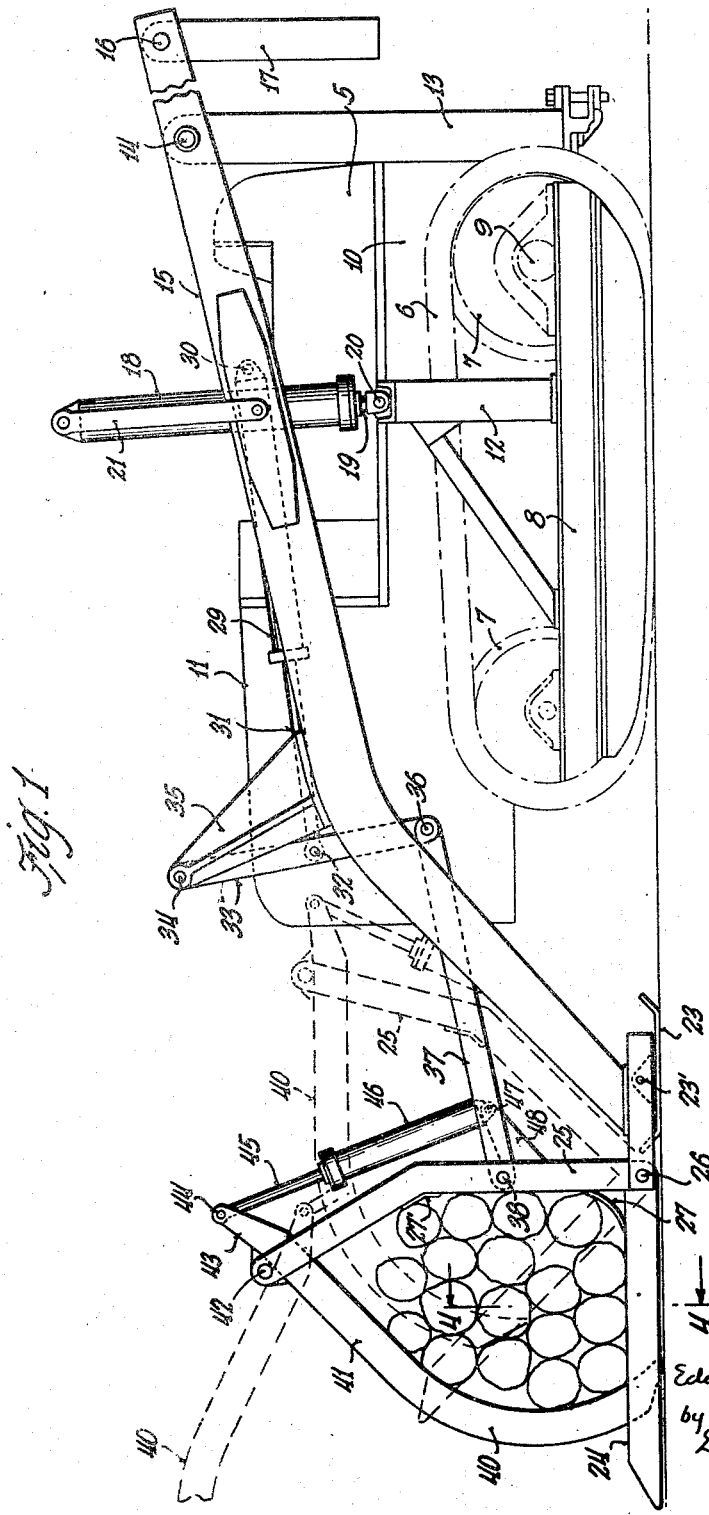

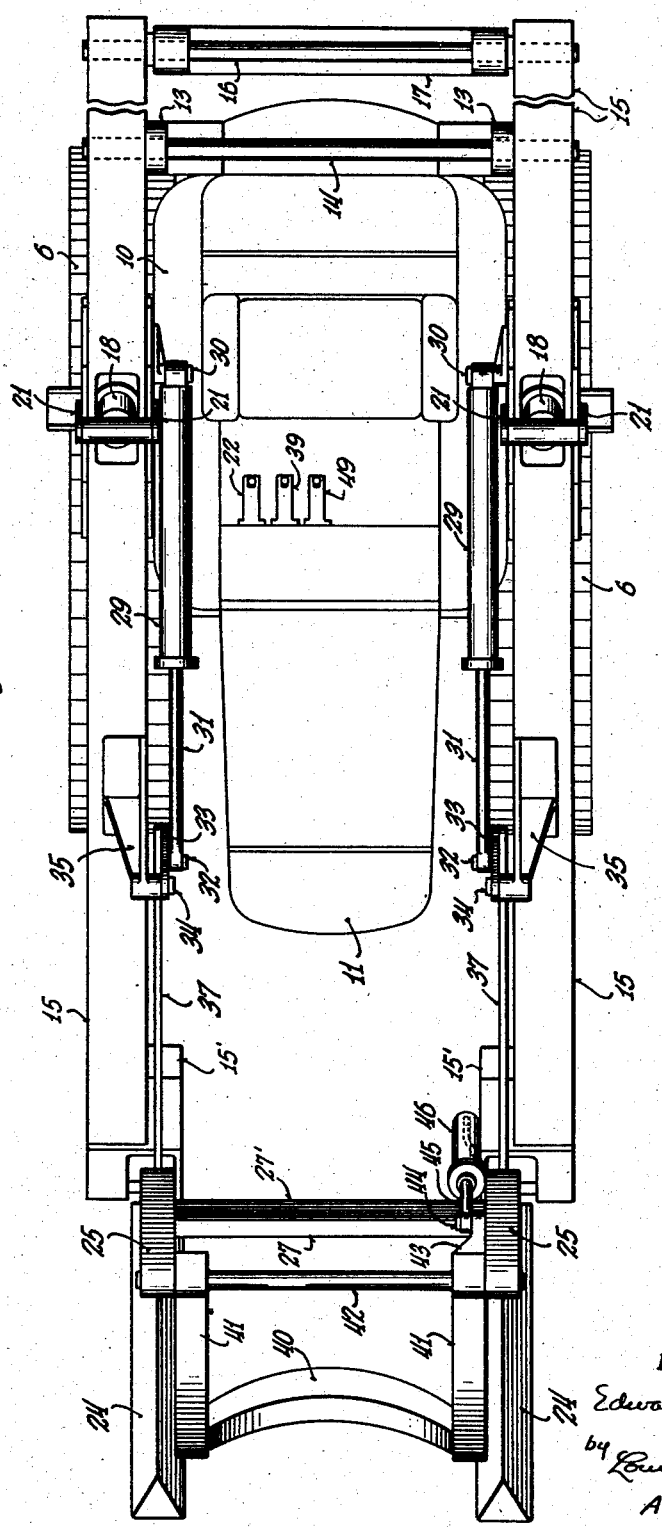

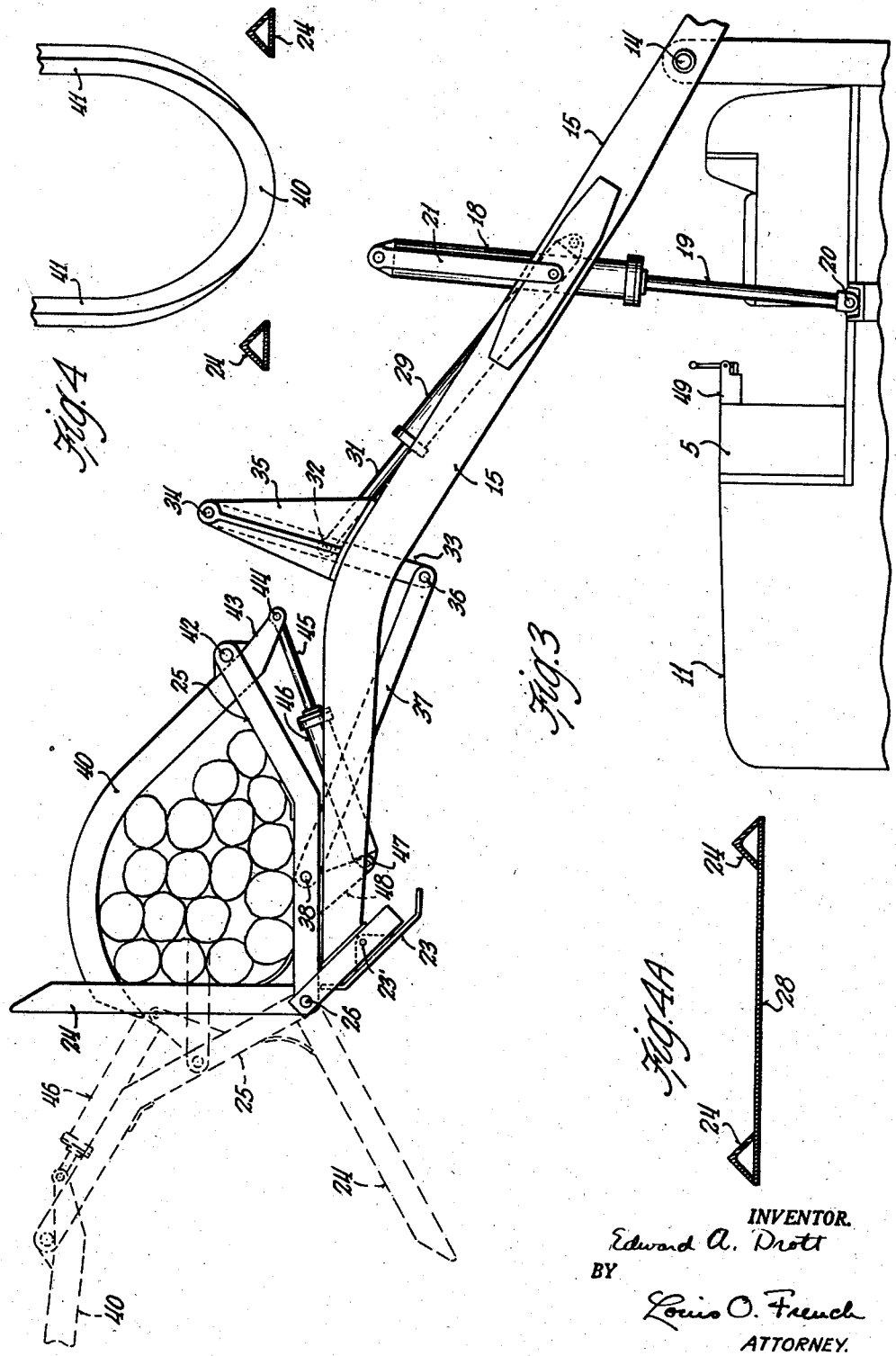

2,418,251

UNITED STATES PATENT OFFICE 2,418,251

LOADER

Edward A. Drott, Milwaukee, Wis.

Application February 14, 1945, Serial No. 577,798

7 Claims. (Cl. 214—140)

The invention relates to loaders.

The main object of the invention is to provide a machine for loading material of various kinds from the ground or floor to a place of deposit such as a truck or storage space. More particularly, the machine includes a pivotally mounted means that may be advanced under the material to be loaded to raise the material from the ground or floor on said means, and then the material so raised is gripped between this means and a pivotally mounted gripper so as to hold the load while the same is skidded to a place of deposit and is then raised to the desired height and dumped into a truck or onto a storage space. While the machine as hereinafter described was particularly designed for handling material such as pulp wood, logs, posts, cut stone, poles, boxes, bales and the like, it may be used on other materials. In the case of pulp wood and similar materials the device is mounted on a tractor and goes into the woods where the cut material lies after being collected into small piles and skids these piles to a large skidway or to a truck or sled from which or by which it may be taken out of the woods.

The invention further consists in the several features hereinafter set forth and more particularly defined by claims at the conclusion hereof.

In the drawings:

Fig. 1 is a side elevation view of a loader embodying the invention;

Fig. 2 is a plan view of the loader;

Fig. 3 is an elevation view of the loader in an elevated position, parts being broken away;

Fig. 4 is a detailed sectional view taken on the line 4—4 of Fig. 1;

Fig. 4A is a detailed view showing certain modifications.

Referring to the drawings, the numeral 5 designates generally a movable support or tractor vehicle, here shown as a tractor having endless propelling and supporting treads 6 at opposite sides and whose sprockets 7 are suitably mounted on track frame 8 which is pivotally mounted on the rear sprocket shaft 9 associated with the frame 10 of the vehicle and driven through suitable transmission mechanism (not shown) by the engine of the power plant 11 mounted on the frame 10, but as the details of the tread structure and its drive from the tractor are not here claimed as new and may be of any suitable construction, further description thereof is deemed unnecessary.

Each track frame 8 has a supporting bracket 12 mounted thereon and upright supports or frame members 13 on the frame 10 are connected by a cross shaft 14 forming a support and pivotal mounting for a pair of load carrying arms 15 which at their back ends are connected together by a cross bar 16 carrying a counter weight 17.

The arms 15 are raised and lowered by hydraulically operated means. This means includes a double acting hydraulic cylinder 18 for each arm, the pistons of said cylinders having their rods 19 pivotally connected at 20 to the upper ends of the brackets 12 and upper ends of said cylinders being operatively connected by a pair of links 21 to intermediate portions of the arms 15. The cylinders 18 are in a hydraulic circuit and under the control of any suitable operator controlled valve mechanism 22 which in known manner permits introduction of pressure fluid to one of the ends of the cylinders while exhausting from the other and which permits retention of fluid in both ends of the cylinders to hold their pistons in any desired set position. Thus through the action of the cylinders 18 and the links 21, the arms 15 are raised or lowered or held in any adjusted position, and pressure may be placed on these arms in their lowered position. Ground or surface engaging shoes 23 are mounted on the outer end portions of the arms at 23' for limited pivotal movement.

Load receiving means are mounted on the outer ends of the arms comprising, in the case of a pulp wood loader and the like, a rack formed of spaced arms 24 that may be pushed under the material to be loaded and upright spaced arms 25, each arm 24 being rigidly connected with its companion arm 25 and pivotally connected at their point of joinder by a pin 26 to the outer ends of the arms 15. Curved transversely extending plates 27 are also preferably welded or otherwise suitably secured at the corner of the arms 24 and 25 and similar plates 27' to the arms 25. For handling some materials the arms 24 may carry a load supporting plate or bottom member 28 as shown in Fig. 4A.

For swinging the rack about its pivotal support on the arms 15 and holding it in any desired adjusted angular position relative thereto, a pair of double acting hydraulic cylinders 29 are pivotally mounted on pin 30 carried by the arms 15, and the rods 31 of their pistons are pivotally connected at their outer ends by pins 32 to the intermediate portions of levers 33 pivotally mounted at one of their ends on pins 34 carried by brackets 35 secured to the arms 15 and pivotally connected at their other ends by pins 36 to one of the ends of companion links 37, the other ends of said links being pivotally connected by pins 38 to the arms 25.

The cylinders 29 are in a hydraulic circuit and under the control of any suitable operator controlled valve mechanism 39 which in known manner permits introduction of pressure fluid to one of the ends of the cylinders while exhausting from the other and which permits retention of fluid in both ends of the cylinders to hold their pistons in any desired set position. Thus through the action of the cylinders 29, the rack formed by the arms 24 and 25 may be swung about its pivots on the outer ends of the arms 15 to any desired angular position relative to said arms 15 and held in any adjusted position. For gripping the load and holding it within the rack, a gripping arm 40 is provided, shown here as a curved end U-shaped member whose legs 41 are pivotally mounted at their upper ends on a shaft 42 carried by the upper ends of the arms 25. For swinging this gripping means relative to the rack, one of the legs 41 of the arm 40 has an extension 43 whose outer end is pivotally connected by a pin 44 to the outer end of the rod 45 of the piston operating in a double acting hydraulic cylinder 46 which is pivotally carried at 47 on a bracket arm 48 secured to one of the arms 25.

The cylinder 46 is in a hydraulic circuit and under the control of any suitable operator controlled valve mechanism 49 which in known manner permits introduction of pressure fluid to one of the ends of the cylinder while exhausting from the other and which permits retention of fluid in both ends of the cylinder to hold its piston and consequently the gripper in any desired set position. Thus through the action of the cylinder 46 the gripper may be swung about the upper end of the rack and relative to its arms and the arms 15 to an open or closed position and held in either position.

With the above construction, to receive a load the arms 15 are lowered and the rack tilted to the position shown in Fig. 1 or in some instances the arms 24 of the rack may be slightly tilted downwardly. The tractor is then driven forwardly so as to push the arms 24 beneath a pile of pulpwood or other material which through this action piles itself up onto the rack between the arms 24 and 25, then when the rack is filled or the pile is depleted, the gripper 41 is swung downwardly from its open position shown in dotted lines in Fig. 1 into its closed or gripping position about the material in the rack, and then the loaded rack with the gripped load is tilted backwardly to the dotted line position adjacent or against the pad 15' on the outer ends of the arms 15 and is then skidded to a place of deposit, the arms 15 then riding on the shoes 23. When the place of deposit, which may be a skidway, a truck or a sled is reached, the arms 15 are lifted to any desired height as shown in full lines in Fig. 3 and then the rack and gripper are tilted forwardly to the dotted line position, there shown to dump the load onto the place of deposit.

Because of the power operation of the rack 24 and the gripper 41 through the hydraulic cylinders 29 and 42 with their control valve mechanism 39 and 49, it is possible to move either the rack or the gripper separately or to move them simultaneously in which instance the rack 24 may be moved upwardly while the gripper 41 is being moved downwardly, and these actions greatly facilitate the securing of a full load from the log pile and the separation of this load from the other logs in the pile that might possibly offer resistance to the separation of some of the logs from the pile, for with this construction after the rack 24 is pushed under the load and the gripper 41 has been brought down to the top of the pile, the rack 24 may be swung upwardly while the gripper 41 is being swung downwardly through the proper manipulation of the valves 39 and 49, so that the logs from the pile are worked in between the rack and the gripper and separated from the rest of the pile to make a full load which is then tilted back upon the arms 15 while the shoes 23 either have a solid contact with the ground or other logs that receive their support from the ground.

It will be noted that under the hydraulic controls of the rack and arms, the setting and carrying of the load can be effected, and that through the action of the independent ram 29 the tilting of the load and transmitting of the same on the shoes 23 can be effected, thus bringing the load closer to the tractor and the rack back to an angle of about forty-five degrees when it is against the pad 15'. While these controls effect the arms and rack, the ram 46 independently handles and controls the arm 40 so as to facilitate handling, transporting, and unloading the material picked up by the rack.

I desire it to be understood that this invention is not to be limited to any particular form or arrangement of parts except in so far as such limitations are included in the claims.

What I claim as my invention is:

1. In a loader, the combination with a tractor vehicle, of a load carrying support mounted on said vehicle and projecting in front of the same, load receiving means tiltably mounted on the front portion of said support, a movable gripper to grip material loaded into said load receiving means as the vehicle advances, ground engaging means at the front end of said support facilitating the skidding of the load to a place of deposit, means for tilting said load receiving means and gripper backwardly on said support while said ground engaging means are in operative position, means for moving said gripper into and out of load gripping position, and means for raising and lowering said support.

2. In a loader, the combination with a tractor vehicle, of a load carrying support mounted on said vehicle and projecting in front of the same, a rack tiltably mounted on the front portion of said support and receiving its load as the vehicle advances, a movable gripper to grip material loaded into the rack as the vehicle advances, ground engaging means at the front end of said support facilitating the skidding of the loaded rack to a place of deposit, means for tilting the rack and gripper backwardly on said support while said ground engaging means are in operative position, means for moving said gripper into and out of load gripping position, and means for raising and lowering said support.

3. In a loader, the combination with a tractor vehicle, of a pair of supporting arms mounted on said vehicle and projecting in front of the same, a rack pivotally mounted on said supporting arms to tilt relative thereto and to load itself as the vehicle advances, a movable gripper to grip the material loaded into the rack, ground engaging elements on said arms for skidding the loaded rack to a place of deposit, means for tilting the rack and gripper backwardly toward said arms while said ground engaging means are in operative position and for moving the same forwardly for discharging the load, means for moving said gripper into and out of load gripping position, and means for positively raising and lowering said arms.

4. In a loader, the combination with a tractor vehicle, of a pair of supporting arms pivotally supported on said vehicle and projecting in front of the same and provided with ground engaging elements, means for raising and lowering said arms, a rack pivotally mounted on the outer ends of said arms to tilt relative thereto and load itself as it is advanced under the material to be loaded, a gripper movably mounted on said rack to grip the material loaded therein, motor means for tilting said gripper and rack about said arms to rearwardly disposed load carrying and forwardly disposed dumping positions, and means carried by said rack for moving said gripper into and out of load gripping position.

5. In a loader, the combination with a tractor vehicle, of a pair of supporting arms pivotally supported on said vehicle and projecting in front of the same and provided with ground engaging elements, hydraulically operated means for raising and lowering said arms, a rack pivotally mounted on the outer ends of said arms to tilt relative thereto and load itself as it is advanced under the material to be loaded, a gripper pivotally carried on said rack to grip material loaded therein, hydraulically operated means for tilting said rack and gripper relative to said arms to displace the load rearwardly over said arms while said ground engaging elements are in an operative position and to move the load to a dumping position when said arms are in a raised position, and hydraulically operated means carried by said rack for moving said gripper into and out of load gripping position.

6. In a loader, the combination with a tractor vehicle, of a movable load carrying support mounted on said vehicle to project therefrom, load receiving means tiltably mounted on the front portion of said support and movable from a load receiving position to a discharging position, a movable gripper mounted on said load receiving means to grip material loaded into said load receiving means, and separate motor means for positively raising and lowering the load carrying support and exerting a downward thrust thereon, for tilting the load receiving means and gripper to a discharging position, and for moving said gripper into and out of load gripping position.

7. In a loader, the combination with a tractor vehicle, of a load carrying support pivotally mounted on said vehicle to project therefrom, load receiving means tiltably mounted on the front portion of said support and movable rearwardly over said front portion to a carrying position and forwardly to a discharging position and to an intermediate load receiving position, a movable gripper mounted on said load receiving means to grip material loaded into said load receiving means, and separate motor means for raising and lowering said load carrying support and exerting a downward thrust thereon in its lowered position, for tilting said load receiving means and gripper to the carrying and discharge positions, and for moving said gripper into and out of load gripping position.

EDWARD A. DROTT.

REFERENCES CITED

The following references are of record in the file of this patent:

UNITED STATES PATENTS

| Number | Name | Date |
|---|---|---|
| 2,326,338 | Drott et al. | Aug. 10, 1940 |
| 2,307,717 | Woodbury | Jan. 5, 1943 |
| 2,338,361 | Shinn | Jan. 4, 1944 |
| 2,348,796 | Ferwerda et al. | May 16, 1944 |
| 2,323,605 | Johnson | July 6, 1943 |
| 2,328,715 | Drott | Sept. 7, 1943 |
| 2,387,656 | Gledhill | Oct. 23, 1945 |
| 2,295,917 | Schwan | Sept. 15, 1942 |
| 544,760 | Freeman | Aug. 20, 1895 |
| 1,013,755 | Elsasser | Jan. 2, 1912 |

FOREIGN PATENTS

| Number | Country | Date |
|---|---|---|
| 525,082 | British | Aug. 21, 1940 |